(12) United States Patent
Horiike et al.

(10) Patent No.: US 8,551,760 B2
(45) Date of Patent: Oct. 8, 2013

(54) SUBSTRATE FOR IMMOBILIZING BIOPOLYMER AND METHOD OF IMMOBILIZING BIOPOLYMER BY USING THE SAME

(75) Inventors: Shigeyoshi Horiike, Kyoto (JP); Yukio Oikawa, Kyoto (JP); Takahiro Nishimoto, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 448 days.

(21) Appl. No.: 12/065,714

(22) PCT Filed: Sep. 5, 2005

(86) PCT No.: PCT/JP2005/016219
§ 371 (c)(1),
(2), (4) Date: Mar. 4, 2008

(87) PCT Pub. No.: WO2007/029302
PCT Pub. Date: Mar. 15, 2007

(65) Prior Publication Data
US 2009/0269742 A1    Oct. 29, 2009

(51) Int. Cl.
*C12M 1/00* (2006.01)
*C12M 1/34* (2006.01)
*C12M 3/00* (2006.01)
*C12Q 1/68* (2006.01)
*B32B 3/10* (2006.01)
*C07H 21/04* (2006.01)

(52) U.S. Cl.
USPC ...... 435/283.1; 435/6.1; 435/287.2; 428/138; 536/24.3

(58) Field of Classification Search
USPC .................... 435/6.1, 283.1, 287.2; 438/138; 536/24.3
See application file for complete search history.

(56) References Cited

U.S. PATENT DOCUMENTS

| 4,802,951 | A  | * | 2/1989 | Clark et al. ..................... 216/56 |
| 5,506,111 | A  | * | 4/1996 | Hosoda et al. ............... 435/7.94 |
| 6,518,194 | B2 | * | 2/2003 | Winningham et al. ....... 438/717 |
| 7,023,547 | B2 | * | 4/2006 | Venkatasubbarao et al. . 356/369 |
| 2002/0123227 | A1 |  | 9/2002 | Winningham et al. |

(Continued)

FOREIGN PATENT DOCUMENTS

| EP | 0 410 004 A1 | 1/1991 |
| JP | 2558956 B2   | 9/1996 |

(Continued)

OTHER PUBLICATIONS

Sugimura et al, Surface potential microscopy for organized molecular system, 2002, Applied Surface Science, 188, 403-410.*

(Continued)

*Primary Examiner* — Narayan Bhat
(74) *Attorney, Agent, or Firm* — Cheng Law Group, PLLC

(57) ABSTRACT

[Problems] To immobilize a chain-type biopolymer in an elongated state at a predetermined position on a substrate. [Means for Solving Problems] A substrate (1) for immobilizing a biopolymer, which has a mask layer (2) provided with multiple through-holes at predetermined positions on a flat active face, is brought into contact with a solution containing a chain-type biopolymer (7). After thus immobilizing the nucleic acid molecule (7) on the active face within a through-hole (3) via physical adsorption or chemical binding, the mask layer (2) is dissolved in a solvent and thus removed while leaving the nucleic acid molecule (7a) alone having been immobilized on the active face within the through-hole (3). Subsequently, the nucleic acid molecule (7a) having been immobilized on the active face is elongated.

11 Claims, 7 Drawing Sheets

(56) References Cited

U.S. PATENT DOCUMENTS

2002/0197568 A1* 12/2002 Neriishi et al. ............... 430/496
2003/0017508 A1* 1/2003 Charych et al. ................ 435/7.9
2004/0033510 A1 2/2004 Bensimon et al.

FOREIGN PATENT DOCUMENTS

| JP | EP0895082 | * | 2/1999 |
| JP | 2003-028865 A | | 1/2003 |
| JP | 2003-107086 A | | 4/2003 |
| JP | 2005-049176 A | | 2/2005 |
| WO | WO-2004/027093 A1 | | 4/2004 |

OTHER PUBLICATIONS

Sukumar et al, Opalescent appearnce of IgG1 antibody at high concentration and its relation ship to noncovalent association, 2004, Pharmaceutical Research, 21, 1087-1093.*

Ffrench et al, Choice of fixation and denaturation for the triple labelling of intra-cytoplasmic antigen, bromodeoxyuridine and DNA Applications to bone marraow plasma samples, 1994, Histochemistry, 101, 385-390.*

International Search Report for the Application No. PCT/JP2005/016219 dated Dec. 6, 2005.

Klein, D. C. G., et al., "Ordered Stretching of Single Molecules of Deoxyribose Nucleic Acid Between Microfabricated Polystyrene Lines", Applied Physics Letters, Apr. 16, 2001, vol. 78, No. 16, pp. 2396-2398.

Notification of Reasons for Refusal for the Application No. 2007-534204 from Japan Patent Office mailed Jul. 13, 2010.

Supplementary European Search Report for the Application No. EP 05 78 1442 dated Nov. 29, 2010.

* cited by examiner

SUBSTRATE FOR IMMOBILIZING BIOPOLYMER AND METHOD OF IMMOBILIZING BIOPOLYMER BY USING THE SAME

TECHNICAL FIELD

The present invention relates to a method of immobilizing a chain-type biopolymer on a substrate and to a substrate for immobilizing a biopolymer used in the above method, for directly observing a chain-type biopolymer such as DNA in the fields of molecular biology, biochemistry, and medical care.

BACKGROUND ART

In a scientific field where a chain-type biopolymer such as a nucleic acid molecule like DNA is measured by a single molecule using a high space-resolution microscope such as a scanning tunneling microscope, it is necessary to immobilize the chain-like biopolymer on a substrate in an elongated state, and a method of preparing a sample for such measurement is known.

In one example of conventional sample preparing methods, after immobilizing a nucleic acid molecule by adding a nucleic acid molecule solution dropwise onto a substrate of highly-oriented graphite or the like, the solution remaining on the substrate is blown off by centrifugal force or by air, whereby the nucleic acid molecule is elongated.

In other examples of methods, a nucleic acid molecule is elongated by a shearing force generated by liquid flow after immobilization of the nucleic acid molecule on a substrate; or a nucleic acid molecule is elongated on a substrate by utilizing surface tension of a gas-liquid interface that is retreating from the site where the nucleic acid molecule is immobilized (see Patent document 1, and Non-patent document 1).

Patent document 1: Japanese Unexamined Patent Publication No. 2005-49176.

Non-patent document 1: D. C. G. Klein, L. Gurevich, J. W. Janssen, L. P. Kouwenhoven, J. D. Carbeck, and L. L. Sohn, "Ordered stretching of single molecules of deoxyribose nucleic acid between microfabricated polystyrene lines," Appplied Physics letters, Volume 78, Number 16, 2001, pp. 2396-2398.

DISCLOSURE OF THE INVENTION

Problems to be Solved by the Invention

A problem common with the conventional techniques is that the position where a nucleic acid molecule is immobilized is perfectly arbitral. In other words, the time required for finding a nucleic acid molecule, which is necessary before the nucleic acid molecule is observed by a microscope having a narrow viewing field like a scanning tunneling microscope, cannot be estimated.

FIG. 9 is a schematic view of a nucleic acid molecule immobilized on a substrate according to a conventional technique. A substrate 20 has a flat surface, and after immobilizing a nucleic acid molecule 22 by bringing a solution containing the same into contact with the flat surface, the nucleic acid molecule 22 is elongated. In particular, when the concentration of the nucleic acid molecule in the solution to be brought into contact with the surface of the substrate 20 is low, the action of auto-organization is small, so that the position where the nucleic acid molecule 22 is immobilized on the substrate 20 completely lacks regularity.

Thus, such a method that is unable to control the position where a nucleic acid molecule is immobilized has very little industrial applicability in future.

It is an object of the present invention to provide a method of immobilizing a chain-type biopolymer in an elongated state at a predetermined position on a substrate, and a substrate suited for the method.

Means for Solving the Problems

A substrate for immobilizing a biopolymer according to the present invention includes: a substrate having a flat surface, the surface being an active face capable of immobilizing a biopolymer via physical adsorption or chemical binding; and a mask layer formed on the active face, made of a material that is removable by a solvent which will not deteriorate a biopolymer, the mask layer having a plurality of through-holes having an opening width of not more than 1 µm at predetermined positions. The substrate enables a biopolymer to be selectively immobilized on the active face in a bottom part of the through-hole.

A biopolymer to be treated by the present invention includes a nucleic acid molecule (DNA or RNA), a peptide, a protein and the like, and in particular, chain-type biopolymers which elongate to become chains.

Preferably, the active face has a surface roughness which is smaller than a molecular radius of a biopolymer in an elongated state.

The active face is not particularly limited, however, for making an electric field available in immobilizing a biopolymer on a thin film within a through-hole, it is preferred that the active face is conductive or semi-conductive, and the mask layer is insulative.

The reference to a solvent that will not deteriorate a biopolymer excludes solvents of strong alkaline which may possibly denature DNA or RNA, and includes weak alkaline, neutral or acidic aqueous solutions and organic solvents. The material that forms a mask layer is not particularly limited insofar as it is dissolvable by such a solvent.

One example of the mask layer is a resist layer which is used in the field of microprocessing such as a semiconductor manufacturing process, and is formed in such a manner that after electron beam exposure, X-ray exposure, light beam exposure or exposure via a mask, a predetermined part is removed by a developing solution to form a through-hole, and then rinsing and baking are carried out as necessary.

Another example of the mask layer is a resin layer formed with a through-hole, which may be formed, for example, by molding.

The present invention also provides a method of immobilizing a chain-type biopolymer in an elongated state at a predetermined position on a substrate, that includes the following steps (A) to (C):

(A) bringing a solution containing a chain-type biopolymer into contact with the substrate for immobilizing a biopolymer according to the present invention, to immobilize the biopolymer on the active face within the through-hole via physical adsorption or chemical bonding;

(B) removing the mask layer by dissolving in a solvent, to leave only the biopolymer immobilized on the active face within the through-hole; and (C) elongating the biopolymer immobilized on the active face.

One preferred example of the substrate having an active face is the one which includes a base substrate having a mirror finished surface, and a thin film formed on the surface of the base substrate having a surface that allows immobilization of a biopolymer. The surface of the thin film serves as the active face.

In one preferred example of step (A), a substrate in which the active face is conductive or semi-conductive and the mask layer is insulative is used as the substrate for immobilizing a biopolymer, the active face is used as one electrode, a counter electrode is disposed in the solution containing a biopolymer, and the biopolymer is attracted to the active face within the through-hole by an electric field by applying voltage between the thin film and the solution.

One example of elongating a biopolymer in step (C) is to elongate a biopolymer by force exerted from a moving gas-liquid interface.

Another example of elongating a biopolymer in step (C) is to elongate a biopolymer by an electric field.

Effect of the Invention

In a substrate for immobilizing a biopolymer according to the present invention, since the position where a biopolymer is to be immobilized is predetermined by a through-hole in a mask layer, the biopolymer that is immobilized using this substrate can be easily found even with a microscope having a narrow viewing field.

This substrate has a mask layer formed on an active face to which a biopolymer can be immobilized, and the mask layer has a through hole and is made of a material that is removable by a solvent that will not deteriorate a biopolymer. Therefore, when such a substrate is used, only the biopolymer that is immobilized on the active face within the through hole is left after immobilizing the biopolymer onto the active face by bringing a solution containing the chain-type biopolymer into contact and removing the mask layer by dissolving it in a solvent. Therefore, by elongating the biopolymer immobilized on the active face subsequently, it is possible to immobilize the chain-type biopolymer in an elongated state at a predetermined position on the substrate.

In this manner, since a biopolymer such as a nucleic acid molecule can be linearly immobilized at a predetermined position in the substrate in an elongated state, it is possible to readily find and observe the nucleic acid molecule even with a microscope having a narrow viewing field.

By setting the surface roughness of the active face smaller than a molecular radius of the biopolymer in an elongated state, the substrate becomes suited for monomolecular observation of the biopolymer by a high space resolution microscopy, such as a scanning tunneling microscopy.

Using a substrate having a conductive or semi-conductive active face and an insulative mask layer, by attracting a biopolymer to the active face within a through-hole by an electric field, it is possible to immobilize a molecule concentratedly while it is still in a small molecular number without the necessity of a duplicating operation. As a result, for example, a nucleic acid molecule sample for observation by a scanning tunneling microscope can be easily provided.

When a photoresist layer is used as a mask layer, a part that is predetermined by a photolithography process is easily removed selectively by a certain developing solution, and most of such developing solutions are solvents that will not deteriorate a biopolymer.

When a molded resin layer is used as a mask layer, it can be removed by an organic solvent that will not deteriorate a biopolymer.

Figure 1:
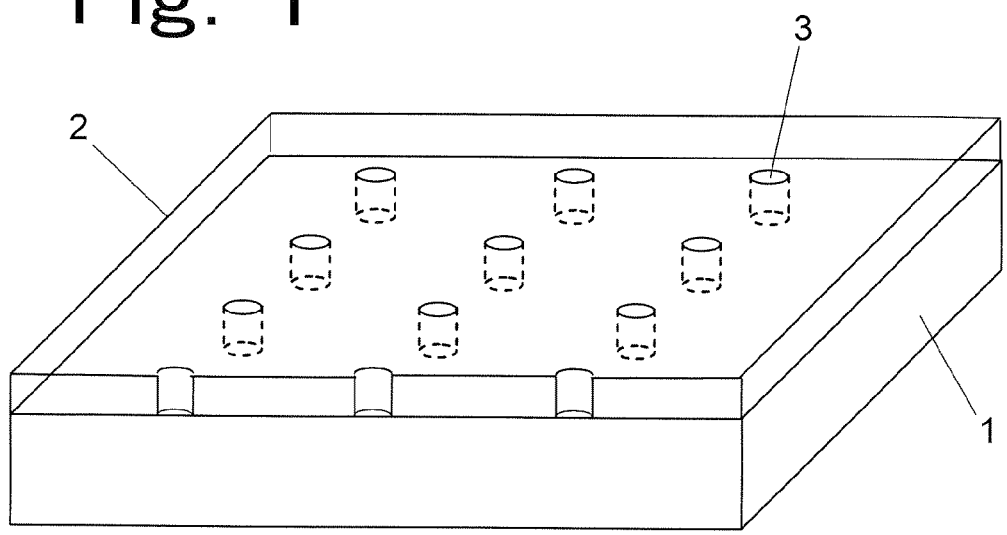
[FIG. 1] A schematic perspective view showing a substrate in one example.

DESCRIPTION OI THE REFERENCE NUMERALS 1, 1a Substrate
2, 2a Mask layer
3, 3a, 4 Through-hole
7, 7a, 11 Nucleic acid molecule
8, 8a Electrde
9, 9a Power source
10 Gas-liquid interface

BEST MODE FOR CARRYING OUT THE INVENTION

FIG. 1 shows one example embodying a substrate for immobilizing a biopolymer.

A substrate 1 has a flat surface which serves as an active face permitting immobilization of a biopolymer via physical adsorption or chemical binding. As to the substrate 1, a sapphire substrate having a mirror finished surface is used as a base substrate, and the mirror finished surface of the base substrate is formed with a gold film by vapor deposition. The surface of the gold film serves as an active face. The gold film has a thickness of 150 nm, and the surface of the gold film is flattened by vapor deposition conducted at a temperature of the substrate of 350° C. Through mirror surface finishing of the surface of the base substrate and flattening by vapor deposition under heating of the base substrate, the formed gold film has an arithmetic average roughness of 0.15 nm. The magnitude of the arithmetic average roughness of the surface is sufficiently smaller than the radius of a ribonucleoside molecule, for example, when DNA is immobilized and elongated as a biopolymer.

On the active face of the substrate 1, a mask layer 2 is formed. The mask layer 2 is made of a material that is removable by a solvent that will not deteriorate a biopolymer, and the mask layer 2 is formed, in advance, with a plurality of through-holes 3 having an opening width of not more than 1 µm at predetermined positions. The through-hole 3 is adapted for immobilization of a biopolymer, and the through-holes 3 are arranged regularly so that the position of an immobilized biopolymer can be readily found even with a microscope having a high space resolution and a narrow viewing field, such as a scanning tunneling microscope. In the bottom part of the through-hole 3, an active face which is the surface of the substrate 1 is exposed, and a biopolymer is selectively immobilized on the active face. The biopolymers such as DNA immobilized in such through-holes 3 are then elongated parallel with each other in the same direction so that they will not interfere with each other in the subsequent elongation step.

In the present example, the mask layer 2 is a positive electron beam resist layer. To be more specific, the mask layer 2 is formed by applying a positive electron beam resist on the surface of the substrate 1, and is provided by electron beam lithography with through-holes 3 having an inner diameter of 50 to 400 nm, e.g., 100 nm, arranged at an interval of 1 µm.

The through-hole 3 formed in the mask layer 2 may be in any shape without being limited to the circular through-hole 3 as shown in the example of FIG. 1. For example, the substrate shown in FIG. 2 represents one such example, and represents the mask layer 2 formed with linear groove-like through-holes 4.

Figure 2:
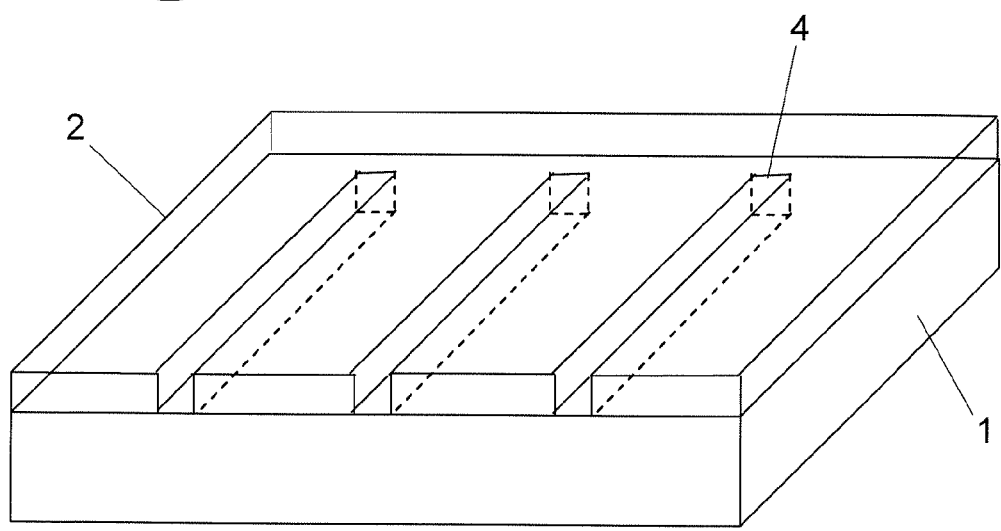
[FIG. 2] A schematic perspective view showing the in substrate in another example.

In the substrate of FIG. 2, a biopolymer is immobilized along the groove of the through-hole 4, and the biopolymers such as DNA immobilized in the through-holes 4 are then elongated in parallel with each other in the direction perpendicular to the longitudinal direction of the groove so that they will not interfere with each other in the subsequent elongation step.

Figure 3A:
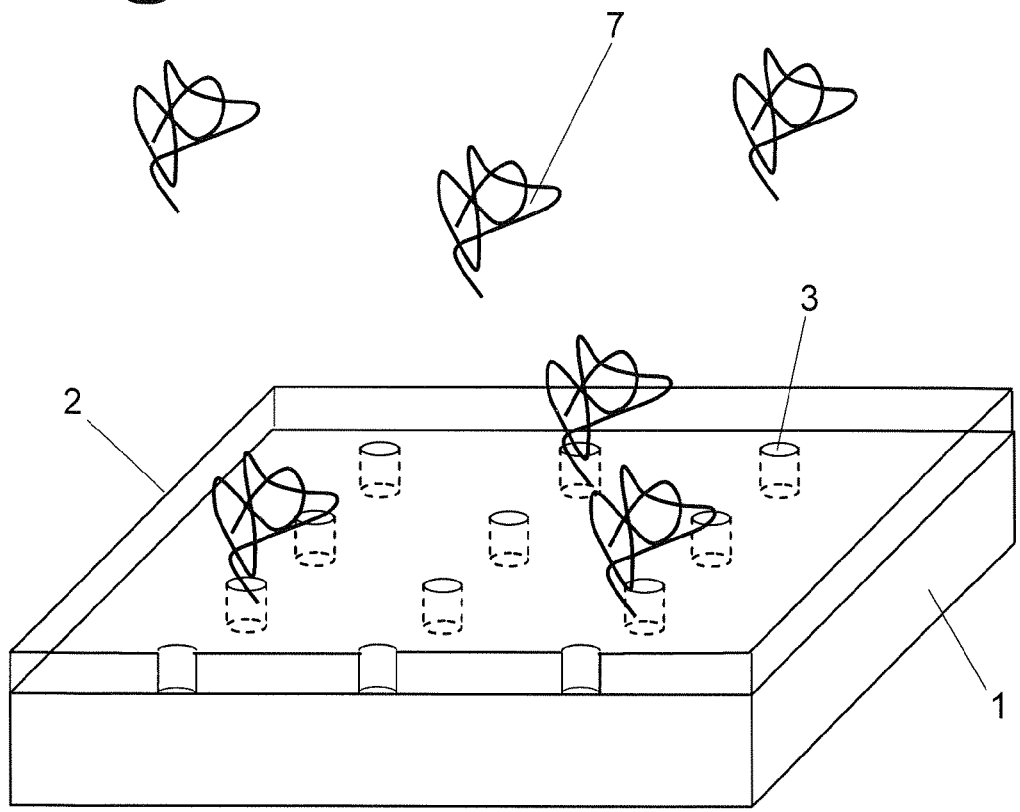
[FIG. 3A] A schematic perspective view showing one example of a method of immobilizing a nucleic acid molecule using the substrate of one example, representing a step of immobilizing, a nucleic acid molecule on the surface of the substrate.
Figure 3B:
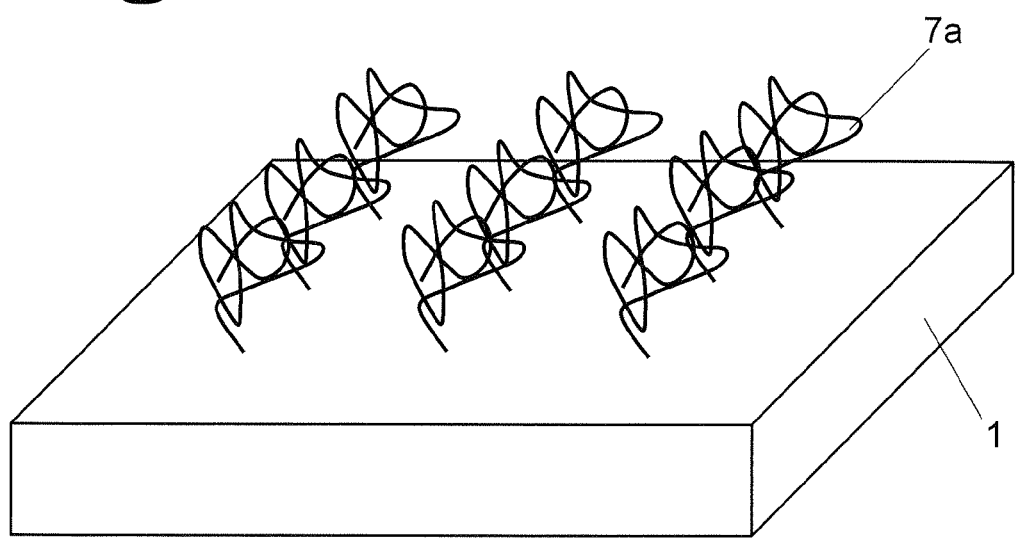
[FIG. 3B] A schematic perspective view showing the same example in the state where the mask layer has been removed.

A method of immobilizing a nucleic acid molecule using the substrate shown in FIG. 1 will be shown in FIG. 3A to FIG. 3B. FIG. 3A shows the state where a solution containing a nucleic acid molecule 7 such as DNA which is a chain-like biopolymer is brought into contact with the substrate. The nucleic acid molecule 7 is floating in the solution (not illustrated), and is folded compactly. The nucleic acid molecule 7 added dropwise to the substrate is immobilized on the surface of the substrate 1 in a bottom part of the through-hole 3 via physical adsorption or chemical bonding.

For example, in the present example, since the substrate 1 is made by covering the surface of a sapphire substrate with a gold film, the nucleic acid molecule 7 can be immobilized on the surface of the gold film by a gold-thiol bond by modifying the terminal of the nucleic acid molecule 7 to have a thiol.

After immobilizing the nucleic acid molecule 7 on the surface of the substrate 1 in the bottom part of the through-hole 3, the resist layer 2 is removed from the surface of the substrate 1 by a solvent, as shown in FIG. 3B. This also removes the nucleic acid molecules 7 that are present in excess in the solution and the nucleic acid molecules 7 that are bonding unspecifically with the resist layer 2, leaving only nucleic acid molecules 7a that are immobilized regiospecifically at the positions where the through-holes 3 were present.

Figure 4A:
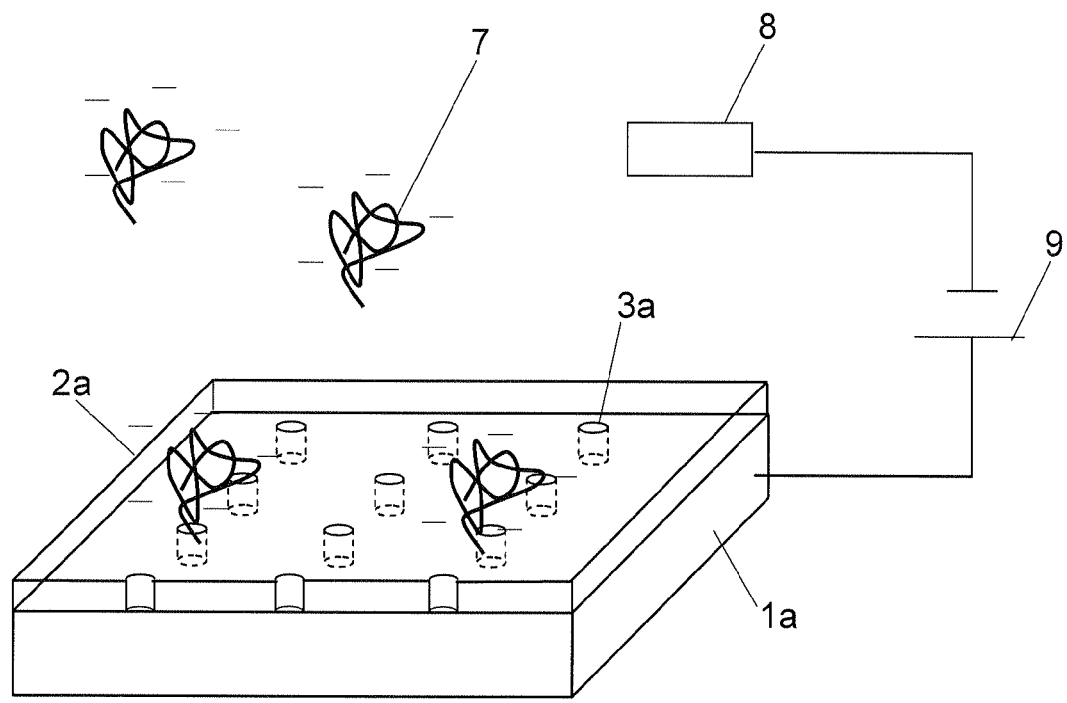
[FIG. 4A] A schematic perspective view showing another example of a method of immobilizing a nucleic acid molecule using the substrate of one example, representing a step of immobilizing a nucleic acid molecule on the surface of the substrate.
Figure 4B:
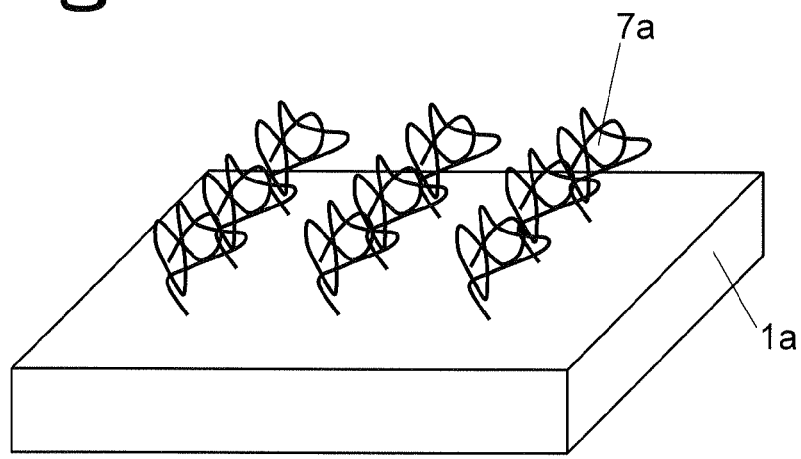
[FIG. 4B] A schematic perspective view showing the same example in the state where the mask layer has been removed.

FIG. 4A and FIG. 4B illustrate a method of immobilizing a nucleic acid molecule which is accompanied by attraction of the nucleic acid molecule 7 by an electric field in immobilization of the nucleic acid molecule on the substrate.

A substrate 1a in FIG. 4A represents that an active face, or surface, is conductive or semi-conductive. The substrate shown in the example of FIG. 1 in which a gold film is formed on the surface of a sapphire substrate is also included in the substrate 1a. Also, such a substrate that is entirely made of a conductive or semi-conductive material and has a mirror finished surface is included in the substrate 1a. A mask layer 2a formed on the surface of the substrate 1a is insulative, and the resist layer shown in the example of FIG. 1 is also included in the mask layer 2a. The mask layer may be another insulative mask layer. As the example of FIG. 1, the mask layer 2a is formed with a through-hole 3a.

An electrode 8 serving as a counter electrode is dipped in the solution (not illustrated) containing the nucleic acid molecule 7, and voltage is applied by a power source 9 between the active face of the surface of the substrate 1a and the electrode 8. Considering the surface of the substrate 1a as a positive electrode, the negatively-charged nucleic acid molecule 7 can be caused to specifically gather to the through-hole 3a. The nucleic acid molecule 7 having gathered to the through-hole 3a is then immobilized on the active face of the surface of the substrate 1a via physical adsorption or chemical bonding.

Also in this case, when the terminal of the nucleic acid molecule 7 is modified to have a thiol, for example, the nucleic acid molecule 7 attracted to the through-hole 3a will be immobilized on the substrate 1a by a gold-thiol bond when a sapphire substrate having a gold film on its surface is used as the substrate 1a.

Then, as shown in FIG. 4B, the nucleic acid molecules 7 that are present in excess in the solution and the nucleic acid molecules 7 that are bonding unspecifically with the mask layer 2a are removed by removing the mask layer 2a, leaving only the nucleic acid molecules 7a that are immobilized regiospecifically at the positions where the through-holes 3a were present.

A method of elongating the nucleic acid molecule 7a that is immobilized on the substrate 1 (or substrate 1a) will be described with reference to FIGS. 5A to 5C.

Figure 5A:
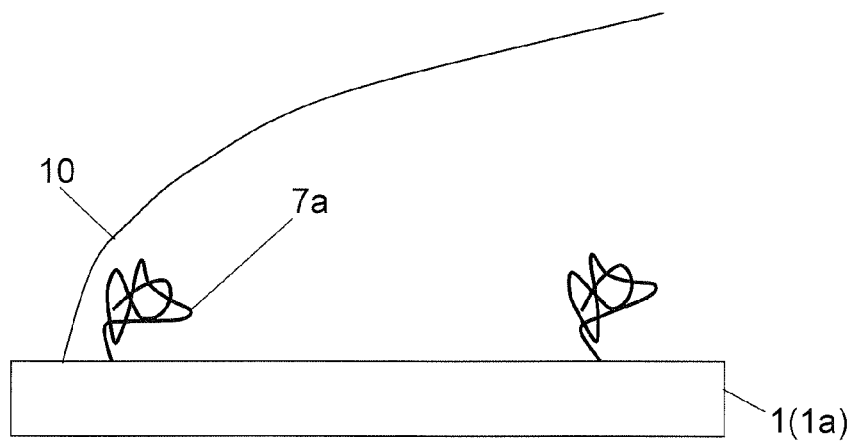
[FIG. 5A] A schematic view showing one example of a method of elongating a nucleic acid molecule immobilized on a substrate, which is a section view showing the state where the nucleic acid molecule is present in a liquid.

FIG. 5A shows the state where the nucleic acid molecule 7a is immobilized at a predetermined position (position where the through-hole of the mask layer was present) in the substrate 1 and present in a gas-liquid interface 10.

Figure 5B:
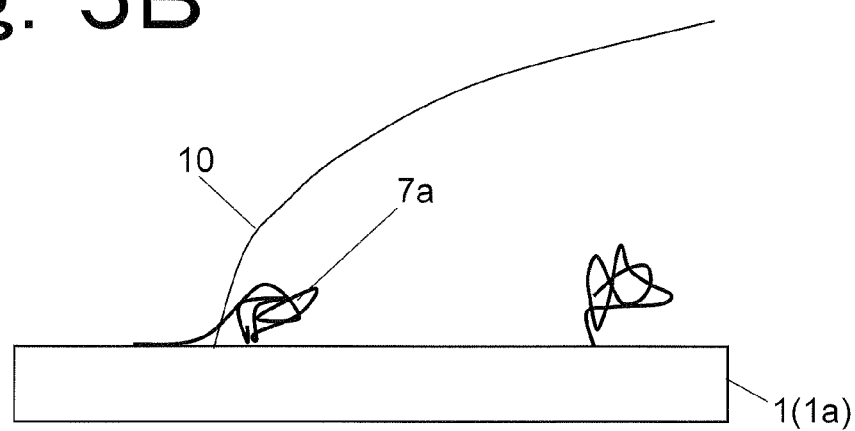
[FIG. 5B] A schematic view showing the same example, which is a section view showing the step of elongating the nucleic acid molecule by retreating the liquid.
Figure 5C:
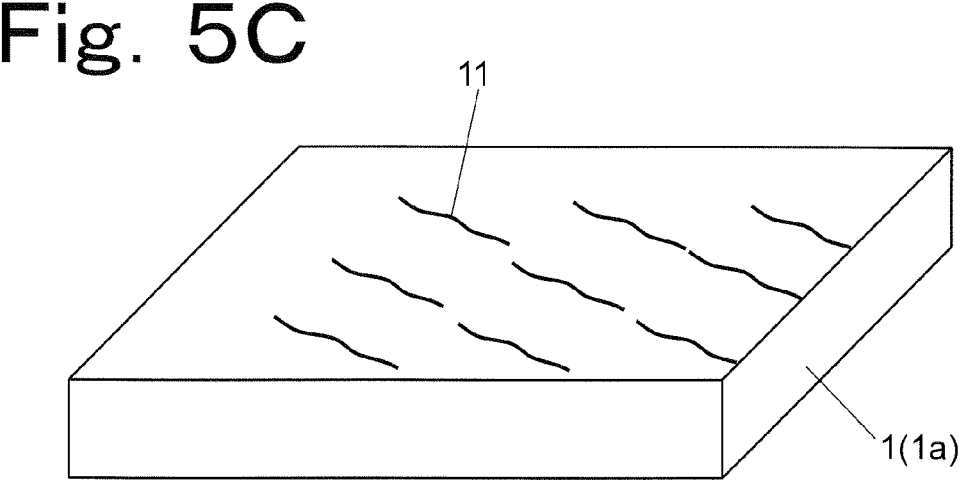
[FIG. 5C] A schematic view showing the same example, which is a perspective view showing the substrate after elongation of the nucleic acid molecule.

FIG. 5B shows the state where the nucleic acid molecule 7a extends on the substrate 1 while it is elongated linearly by meniscus force acting from the gas-liquid interface 10 by retraction of the liquid or by shear force of the liquid as a result of flow or evaporation of the liquid. Since the nucleic acid molecule 7a is immobilized regiospecifically on the substrate 1, nucleic acid molecules 11 are immobilized while they are arranged regularly in an elongated state as shown in FIG. 5C.

Figure 6:
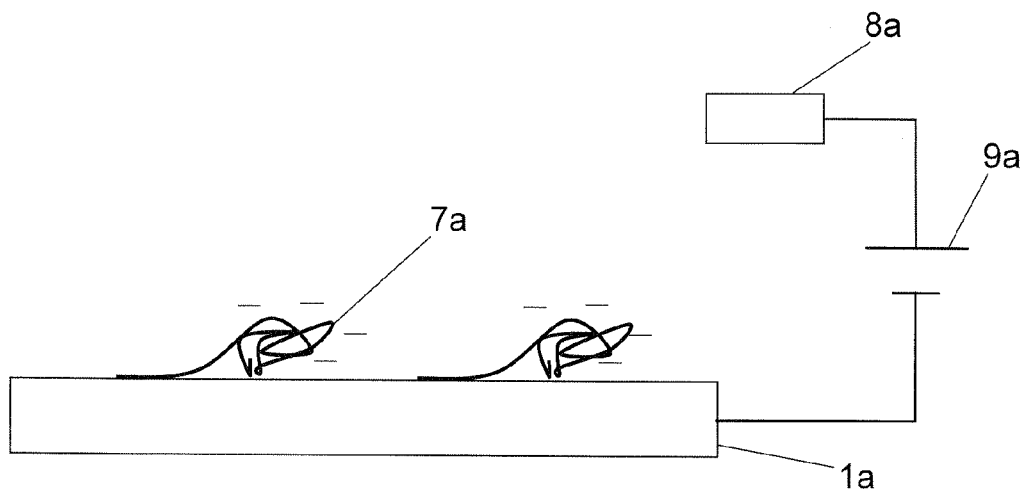
[FIG. 6] A schematic section view showing another example of a method of elongating a nucleic acid immobilized on a substrate.

FIG. 6 shows a method of elongating a nucleic acid molecule by an electric field following the immobilization in which a nucleic acid molecule is attracted by an electric field, as shown in FIGS. 4A to 4B. After removal of the mask layer 2a, the substrate 1a and the counter electrode 8a are arranged via a buffer solution (the substrate 1a, the nucleic acid molecule 7a and the electrode 8a are in the buffer solution, although not illustrated), and by applying voltage from a power source 9a with respect to the counter electrode 8a as a positive electrode, the negatively-charged nucleic acid molecule 7a is attracted to the positive electrode and elongated. Thereafter, the buffer solution is removed to obtain the nucleic acid molecules 7a that are immobilized and elongated while they are arranged regularly on the substrate 1a.

Figure 7:
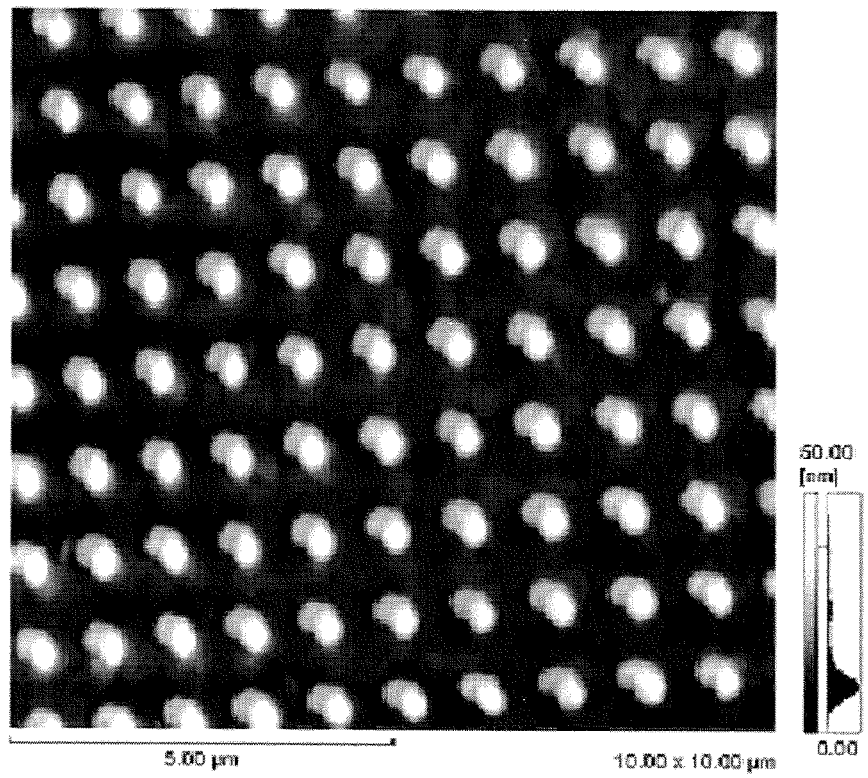
[FIG. 7] An atomic force microscopic image of a substrate on which a nucleic acid molecule is immobilized, shown in the state before removal of a mask layer.

FIG. 7 is an atomic force microscopic image showing the substrate on which DNA is immobilized as a nucleic acid molecule in the state before removal of the mask layer. This example represents the case where the method of immobilizing a nucleic acid molecule involving attraction of the nucleic acid molecule 7 by an electric field shown in FIGS. 4A to 4B is employed using the substrate 1 on which a resist is formed as the mask layer 2 having the through-holes 3 having an opening width of 100 nm, on the gold/sapphire substrate 1 shown as the first example. The white points that are regularly arranged represent λ DNA of 48.5 kb (equivalent to a DNA length of $48.5 \times 10^3$ in number of bases) immobilized in the respective through-holes.

Figure 8A:
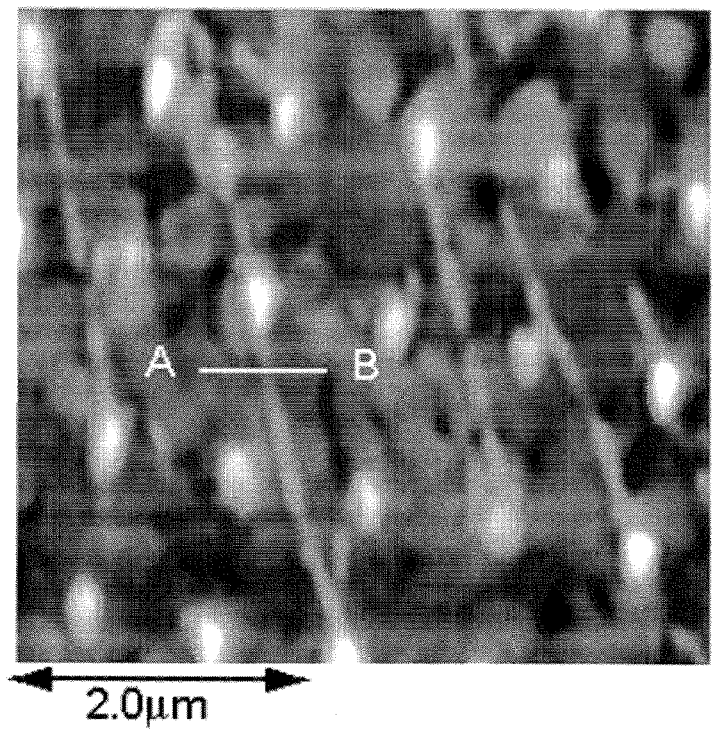
[FIG. 8A] An atomic force microscopic image in the state where a mask layer is removed from a substrate on which a nucleic acid molecule is immobilized, and after elongation of DNA.

FIG. 8A is an atomic force microscopic image after elongation of immobilized DNA following removal of the resist embodied by the mask layer 2 from the gold/sapphire substrate shown in FIG. 7.

Figure 8B:
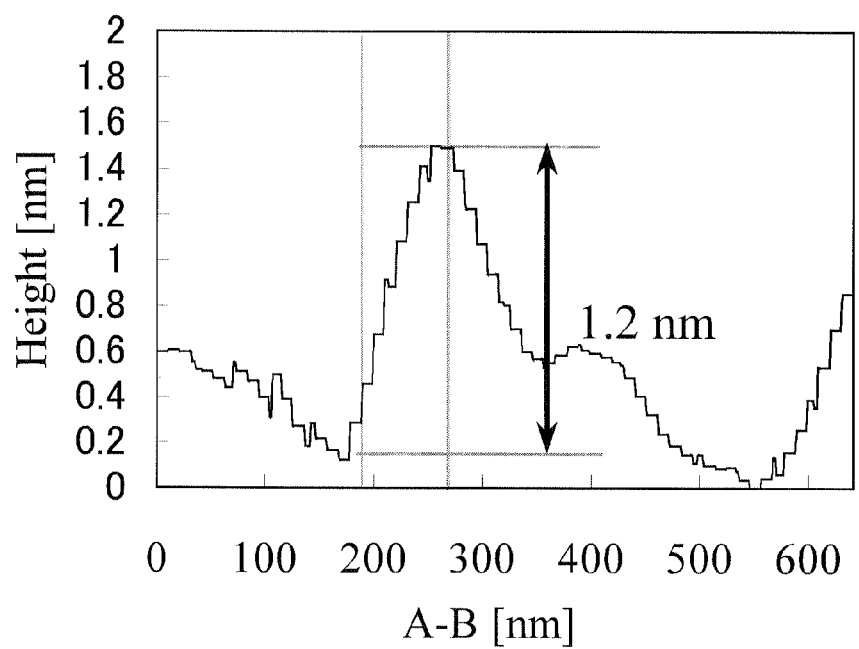
[FIG. 8B] A graph showing a cross section shape alone the line A-B.
Figure 9:
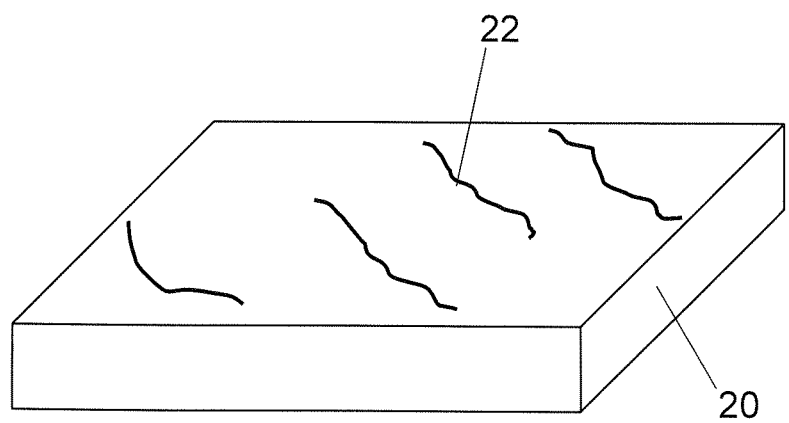
[FIG. 9] A schematic perspepective view showing the state where a nucleic acid molecule is immobilized on a substrate and elongated according to a conventional method.

FIG. 8B shows a cross section shape at the A-B position in FIG. 8A, and shows the shape obtained by cutting the elongated DNA in the direction that is perpendicular to the longitudinal direction. It can be understood that the white image extending in FIG. 8A is elongated DNA, based on the height information of the image.

The method of elongating and immobilizing a nucleic acid molecule using the gold/sapphire substrate represented in the example enables a nucleic acid molecule to be immobilized on a conductive film, so that the method may be utilized as a method of preparing a DNA sample for base sequence analysis in which a base sequence is directly determined by sequentially reading kinds of bases of a nucleic acid molecule by a scanning tunneling microscope, and thus contributes to improve the accuracy of DNA analysis in the medical field.

INDUSTRIAL APPLICABILITY

The substrate of the present invention and the method of elongating and immobilizing a biopolymer using the same can be used for observation of a biopolymer by means of a high-resolution microscope such as a scanning tunneling microscope in the fields of molecular biology, biochemistry and medicines.

The invention claimed is:

1. A substrate for immobilizing a biopolymer, comprising:
a substrate having a flat surface, an entire surface of the substrate being covered with a gold film as an active face capable of immobilizing the biopolymer via physical adsorption or chemical binding, so that a voltage is capable of being applied to the active face; and
a mask layer formed on said active face, made of a resist layer that is to be removed by a solvent which will not deteriorate the biopolymer after the biopolymer is immobilized on the active face, the mask layer having a plurality of through-holes having an opening width of not more than 1 μm at predetermined positions,
the substrate being intended for selectively immobilizing the biopolymer on said active face in a bottom part of said through-hole.

2. The substrate for immobilizing a biopolymer according to claim 1, wherein said substrate having said active face includes:
a base substrate having a mirror finished surface, and
a thin film formed on said surface of said base substrate, having a surface that allows immobilization of the biopolymer, and
the surface of said thin film serves as the active face.

3. The substrate for immobilizing a biopolymer according to claim 1, wherein said active face has a surface roughness which is smaller than a molecular radius of said biopolymer in an elongated state.

4. The substrate for immobilizing a biopolymer according to claim 1, wherein said mask layer is insulative.

5. The substrate for immobilizing a biopolymer according to claim 1, wherein said mask layer is a resist layer in which said through-holes are formed through the process of light exposure and development.

6. The substrate for immobilizing a biopolymer according to claim 1, wherein said mask layer is a resin layer formed with said through holes.

7. A method of immobilizing a biopolymer for immobilizing a chain-type biopolymer in an elongated state at a predetermined position on a substrate, the method comprising the steps of:
(A) bringing a solution containing a chain-type biopolymer into contact with the substrate for immobilizing a biopolymer according to any one of claims 1 to 6, to immobilize said biopolymer on said active face within said through-hole via physical adsorption or chemical bonding;
(B) removing said mask layer by dissolving in a solvent, to leave only said biopolymer immobilized on said active face within said through-hole; and
(C) elongating said biopolymer immobilized on said active face.

8. The method of immobilizing a biopolymer according to claim 7, wherein as said substrate for immobilizing a biopolymer, the one in which said active face is conductive or semi-conductive and said mask layer is insulative is used, and
in said step (A), said active lace is used as one electrode, and a counter electrode is disposed in said solution containing a biopolymer, and said biopolymer is attracted to said active face within said through-hole by an electric field by applying voltage between said active face and said solution.

9. The method of immobilizing a biopolymer according to claim 7, wherein in said step (C), a biopolymer is elongated by force exerted from a moving gas-liquid interface.

10. The method of immobilizing a biopolymer according to claim 7, wherein in said step (C), a biopolymer is elongated by an electric field.

11. The method of immobilizing a biopolymer according to claim 7, wherein said biopolymer is a nucleic acid molecule.

* * * * *